INVENTOR
Harold A. Denmire
BY Evans & McCoy
ATTORNEYS

Patented Feb. 20, 1934

1,947,974

UNITED STATES PATENT OFFICE 1,947,974

APPARATUS FOR INSULATING AND WRAPPING TIRE BEAD WIRE

Harold A. Denmire, Akron, Ohio, assignor to The General Tire & Rubber Company, Akron, Ohio, a corporation of Ohio Application May 30, 1930. Serial No. 457,636

10 Claims. (Cl. 154—9)

This invention relates to a method of and apparatus for manufacture of bead rings for reinforcing the bead portions of pneumatic tire casings.

Bead rings have been heretofore employed which were reinforced by a wire tape wrapped in a plurality of superimposed convolutions with layers of raw rubber between adjacent convolutions of the wire tape. The wire tape consisted of substantially parallel longitudinal wires and one or more spirally extending wires interwoven with the longitudinal wires. The weaving of the wire tape is a slow and expensive operation and the wire reinforcement in the bead ring is somewhat deformed by the weaving process, so that the wire tape has a certain amount of extensibility which is objectionable in a bead reinforcement. In addition, the embedding of the wire tape in rubber in the process of forming the bead ring as well as the weaving of the wire tape is a slow and expensive operation.

Another method which has been proposed is to form a flat wire reinforced tape by covering spaced wires with raw rubber in an extruding machine and winding the wire reinforced rubber tape so formed in superimposed convolutions on the drum or mandrel of a bead ring machine.

The latter method eliminates the wire weaving operation, but is open to the objection that when the tape is put under tension in the bead ring machine, the outer convolutions of wire are drawn inwardly toward the inner convolutions, cutting their way through the raw rubber, with the result that the bead ring is distorted and the reinforcing wires, instead of being uniformly spaced, are bunched together.

The present invention has for an important object to provide a method of making bead rings in which a rubber tape is formed by passing regularly spaced parallel wires through an extruding machine and by which the tape is wrapped with an exterior holding strand, cable or wire which serve to hold the wires of superimposed layers of tape in proper spaced relation and prevent distortion of the bead ring and bunching of the reinforcing wire therein when the tape is wrapped on the drum of the bead ring machine.

A further object is to provide apparatus for rapidly and efficiently forming the wire reinforced tape and winding the same into bead rings.

A further object is to improve the operation of machines of this character by providing means whereby the tape forming mechanism may be operated continuously while the bead ring machine is operated intermittently.

A further object is to provide a continuous machine including an extruding mechanism in which the reinforcing wires are embedded in a body of rubber to form a tape, mechanism for continuously delivering the tape from extruding mechanism to a bead ring machine and mechanism interposed between the extruding mechanism and bead ring machine for continuously wrapping the tape to prevent distortion of the tape and reinforcing wires in the bead ring forming machine.

A further object is to provide means for heating and cleansing the wire prior to its passage through the extruding head.

A further object is to provide supporting reels for the tape reinforcing wire, which are so mounted that fresh coils of wire can be quickly and easily mounted in the reels.

A further object is to provide means whereby a considerable number of reels of wrapping wire may be used before it becomes necessary to sever the tape and provide a new supply of wrapping wire.

A further object is to provide means for automatically taking up the slack in the tape being fed to the ring forming machine during intervals in which a completed ring is being removed from the machine.

A further object is to provide means for controlling the operation of the tape forming and feeding mechanism to automatically stop the same when a predetermined amount of tape accumulated adjacent the ring forming machine and to automatically start said feeding mechanism when a predetermined amount of tape has been taken up by the bead ring machine.

A further object is to provide an extruding device in which means is provided for positively feeding the rubber to the extruding chamber through which the wire passes and in which means is provided for preventing creation of an excessive pressure in the extruding chamber.

A further object is to provide means by which the feeding means of the extruding device may be continuously operated while the wire feeding means is stopped to prevent cooling and hardening of the rubber in the extruding chamber.

With the above and other objects in view, the invention may be said to comprise the method and apparatus as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which.

Figure 22:
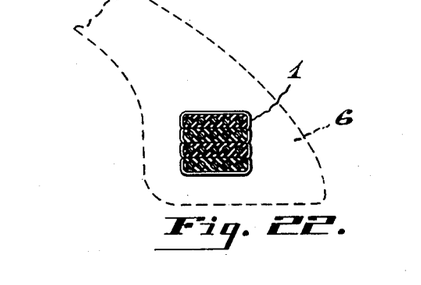
Fig. 22 is a sectional view showing the bead ring embedded in the bead portion of a pneumatic tire casing.

Referring first to Figs. 17 to 22 of the drawings, the bead ring 1 is composed of a number of superimposed convolutions formed by wrapping a flat tape 2 on a cylindrical drum or mandrel. The tape 2 consists of a body of rubber 3 which is reinforced by a series of parallel spaced longitudinal wires 4, the rubber body 3 completely enveloping the reinforcing wires forming a flat tape substantially rectangular in cross-section. The wire reinforced rubber tape is wrapped with a holding strand, preferably a wire 5 which extends spirally around the flat rubber tape and which serves to hold the tape against distortion and preserve the parallel and spaced relationship of the reinforcing wires in the completed bead ring 1. The rubber body 3 of the tape is raw rubber applied to the parallel wires 4 in a suitable extruding machine and delivered directly from the extruding machine to a bead ring machine, which wraps the tape in superposed convolutions on a cylindrical drum. The completed ring is rectangular in cross-section and is vulcanized in the bead portion 6 of a pneumatic tire casing, as shown in Fig. 22, forming an inextensible reinforcement for the bead portion of the casing.

In the process of manufacture of the bead ring, a series of wires are fed from reels, guided into closely spaced parallel relation and passed continuously through a heating and cleansing device, which heats the wires and removes any grease adhering thereto. The wires pass from the cleansing device through an extruding head which completely envelops the row of parallel wires in a body of raw rubber, the raw rubber forming a flat tape 1 substantially rectangular in cross section. The tape issuing from the extruding head passes through a wrapping machine which wraps a holding strand such as a soft iron wire of small diameter spirally around the flat tape. After passing through the wrapping machine, the wrapped tape is drawn through a cooling tank containing cold water and passes from the tank to a festooning device which is adapted to take up a predetermined amount of slack tape and, from the festooning device, the tape is delivered to a bead forming machine which comprises a rotatable drum or mandrel which receives the end of the tape and wraps the same in the desired number of superimposed convolutions to form the bead ring. The bead ring forming machine operates intermittently, being stopped after each ring is formed to permit the completed ring to be removed. The festooning device is adapted to accommodate an amount of tape corresponding to that which would normally be fed through the extruding head wrapping and cooling device in the time required to remove a ring from the drum or mandrel of the bead ring machine, so that the tape forming and wrapping mechanisms may operate continuously while the bead ring machine is operated intermittently.

Figure 1:
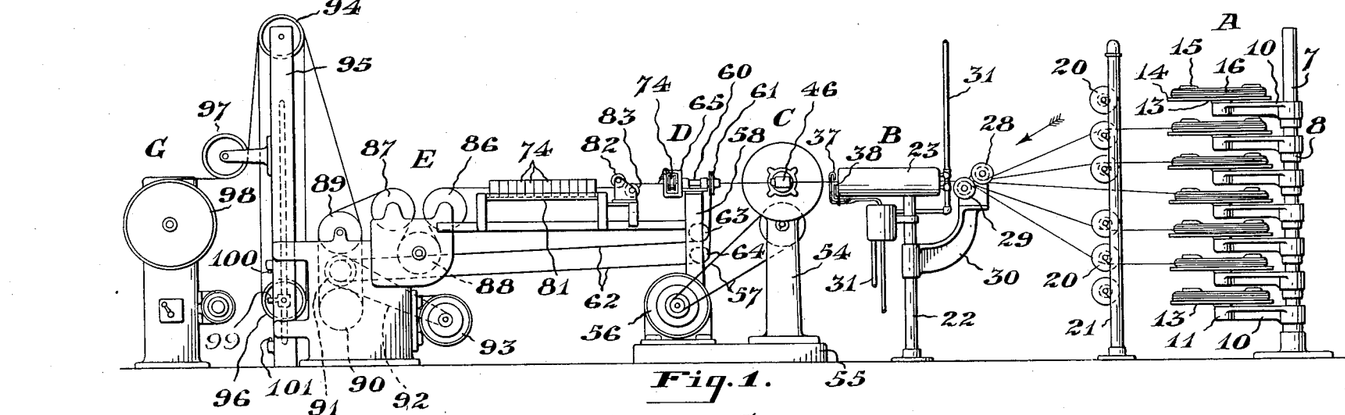
Figure 1 is a side elevation of the bead ring forming apparatus embodying the invention.
Figure 2:
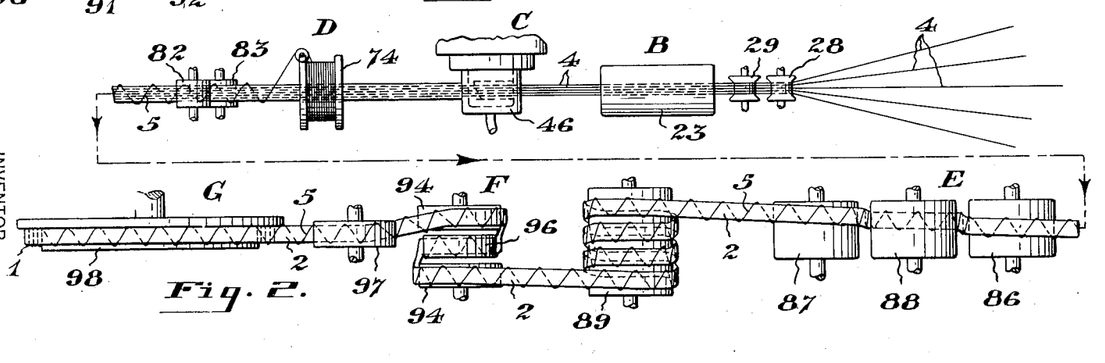
Fig. 2 is a diagrammatic plan view showing the course of the wire to the extruding mechanism and of the tape from the extruding mechanism to the bead ring forming machine.

Referring particularly to Figs. 1 and 2 of the drawings, the apparatus of the present invention consists of a reel support A adapted to rotatably support a series of superposed reels of wire, a steam chest B through which wire from the reels is passed, an extruding machine C which receives the wire from the steam chest, a wrapping machine D, a cooling tank E, a festooning device F, and a bead ring machine G to which the tape is delivered from the festooning device.

Figure 3:
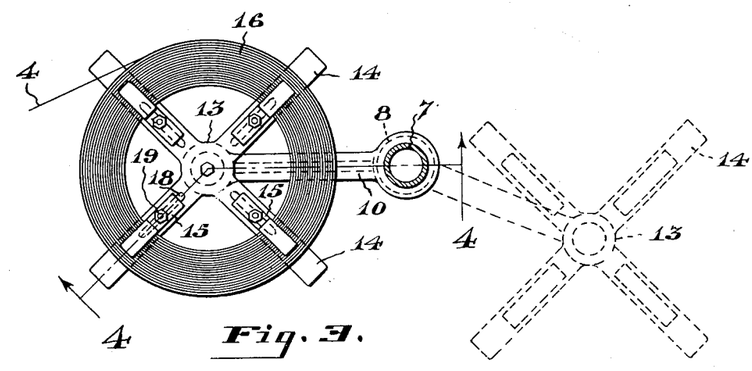
Fig. 3 is a plan view of one of the reel supports from which wire is delivered to the extruding mechanism.
Figure 4:
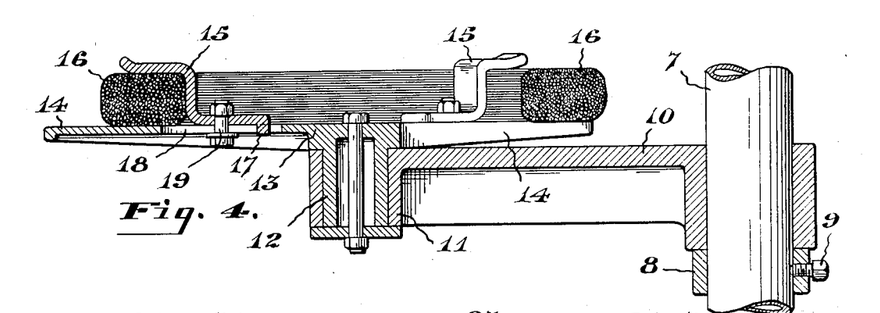
Fig. 4 is a section taken on the line indicated at 4—4 in Fig. 3.

As best shown in Figs. 3 and 4, of the drawings, the reel support "A" comprises a cylindrical standard 7 which has a series of vertically spaced adjustable collars 8, each of which is provided with a set screw 9 by which it may be rigidly secured in adjusted position on the standard. Each of the collars 8 provides a support for a radial arm 10, rotatably mounted on the standard. Each of the arms 10 has a bearing boss 11 at its outer end which is formed to receive the vertically disposed hub 12 of a wire holding reel 13. Each of the reels has radial arms 14, each of which is provided with an angle clip 15 formed to engage the interior and top faces of a wire coil 16 to center the coil with respect to the reel and to hold the same in place on the reel. Each of the clips 15 is provided at its inner end with a lug 17 which fits in a radial slot 18 in the arm upon which the clip is mounted. Clips 15 are radially adjustable on the arms and are clamped in adjusted position by means of bolts 19 which extend through the clips and through the radial slots 18. A suitable number of superposed reels of wire are mounted on the arms 14 and the wires are lead from the reels over guide sheaves 20 mounted on a vertical standard 21 in front of the reel support.

Figures 5, 6:
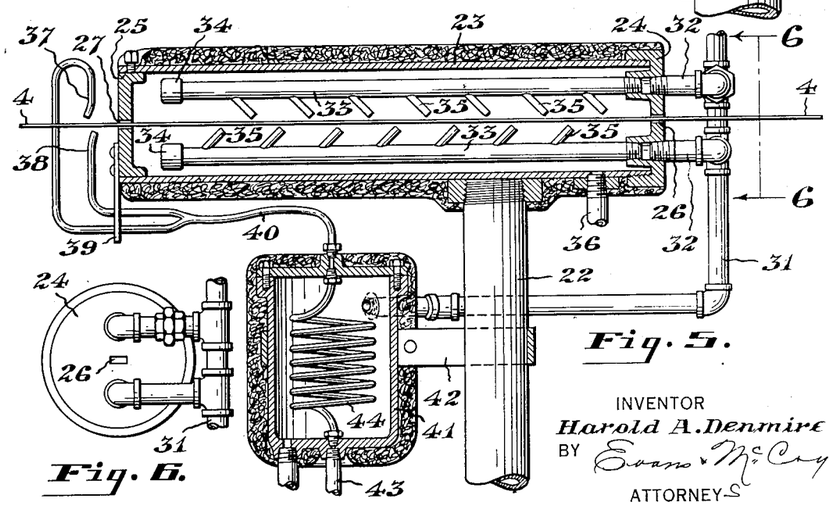
Fig. 5 is an axial vertical section through the steam chest which is located between the wire holding reels and the extruding mechanism and through which the wire passes on its way to the extruding mechanism.
Fig. 6 is an end elevation of the steam chest viewed as indicated by arrows 6—6 in Fig. 5.
Figures 7, 8, 9, 10:
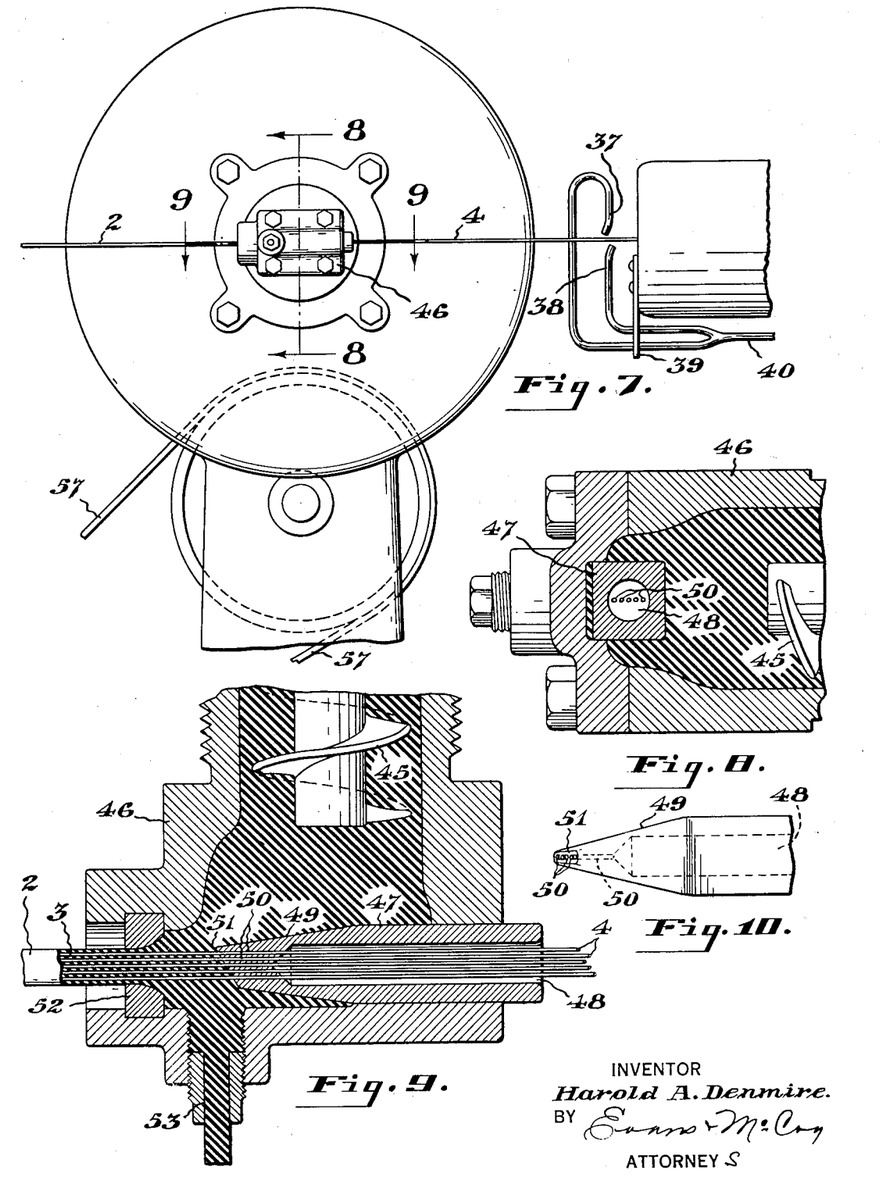
Fig. 7 is a side elevation of the extruding machine on an enlarged scale.
Fig. 8 is a section taken on the line indicated at 8—8 in Fig. 7.
Fig. 9 is a section taken on the line indicated at 9—9 in Fig. 7.
Fig. 10 is a top plan view of the wire guide in the extruding chamber.

The steam chest B is mounted on the upper end of a vertical standard 22 in advance of the standard 21 and this steam chest consists of an elongated cylindrical body portion which is horizontally disposed and which is closed at the ends by removable heads 24 and 25. The heads 24 and 25 are provided at their centers with transversely elongated slots 26 and 27 which are of a length to permit the passage of a horizontally disposed row of wires, as they are drawn from the wire reels 13. In order to bring the wires into a horizontal plane in closely spaced parallel relation and to guide the same into the slot 26 of the steam chest, a pair of concave guide rollers 28 and 29 are mounted at the rear of the steam chest on a bracket 30 carried by the standard 22, the wires passing from the sheaves 20 under roller 28 and over the roller 29. Steam is supplied to the steam chest through a pipe line 31 which has branches 32 threaded into openings in the head 24 above and below the slot 26. The branches 32 communicate with tubes 33 which extend longitudinally within the steam chest substantially throughout the length thereof above and below the plane of the wires passing through the steam chest. At their forward ends, the tubes 33 are closed by caps 34 and each of the tubes is provided with rearwardly directed nozzles 35 whose discharge ends are closely adjacent the wires passing through the chest. Steam is thus discharged directly against the wires during their passage through the steam chest to gradually heat the wires during their passage through the steam chest and to thoroughly cleanse the surfaces of the wires of grease and other foreign matter adhering thereto. The steam chest is provided with a drain pipe 36 to drain off water of condensation together with grease and dirt removed from the surface of the wires. The head 25 is readily removable to permit access to the interior of the steam chest for cleaning.

In order to thoroughly dry the wires before they pass into the extruding head, jets of hot air are directed upon the wire from above and below immediately in front of the steam chest by means of tubes 37 and 38, which have their discharge ends positioned, one immediately above and the other immediately below the wires issuing from the steam chest, the tubes 37 and 38 being supported by a bracket 39 attached to the head 25. The tubes 37 and 38 merge into a tube 40 which is attached to the top or cover of a heating chamber 41, which is interposed in the steam line 31, the chamber 41 being supported on the standard 22 by means of a bracket 42.

An air supply line 43 leading from a source of air under pressure is attached to the bottom of the heating chamber 41 and within the heating chamber, there is a coil 44 which is attached at its upper and lower ends to the top and bottom of the heating chamber in communication with the pipes 40 and 43. The air passing through the coil in the heating chamber is heated sufficiently to effectively evaporate any moisture on the wires issuing from the steam chest, so that the wires passing through the extruding device C are hot, dry and clean.

As best shown in Figs. 7 to 10, the extruding mechanism, which receives raw rubber from a suitable rubber mill, is provided with a feed screw 45 which forces the rubber in a continuous stream into an extruding head 46 through which the parallel wires are fed. The extruding head is closely adjacent the steam chest and is provided with a horizontally disposed wire guide 47 which is alined axially with the steam chest. The wire guide, which is mounted in an opening in a side wall of the head adjacent the end thereof is rectangular in cross section and has an axial bore 48 extending inwardly from its outer end and terminating short of its inner end, which is of a diameter sufficient to accommodate the row of parallel wires issuing from the steam chest. The wire guide is rectangular in cross section, fits against the end wall of the head and is provided with a tapering inner end 49 projecting beyond the bore 48 and terminating near the forward wall of the head. The tapering end of the guide is provided with a horizontally disposed row of parallel wire guiding apertures 50 leading from the forward end thereof to the bore 48, which serve to hold the wires in proper spaced relation during their passage through the extruding chamber. The tapered end 49 of the wire guide has an end face 51 beveled across the ends of the apertures 50 on the side opposite that from which the rubber is fed, which serves to prevent deflection of the wires by the moving mass of rubber through which the wire passes in the steam chamber, the side of the guide toward the feed screw 45 extending forwardly a greater distance than the opposite side of the guide, so that the wires are shielded from the pressure of the slowly moving mass of rubber. Immediately in advance of the forward end of the wire guide, the extruding chamber has an outlet in the form of an extruding die 52, which has a transversely elongated substantially rectangular aperture which flares inwardly and serves to direct a stream of rubber with the wires passing through the aperture of the die so that the wires are completely enveloped in an integral body of rubber to form a substantially rectangular tape. The feed screw 45 is continuously operated and to prevent creation of excessive pressure in the extruding chamber, the chamber is provided with an overflow outlet 53 in the end wall adjacent the extruding die through which excess rubber may be forced. In the normal operation of the extruding mechanism, the rubber is fed by the screw 45 at a rate such as to maintain a pressure in the extruding chamber sufficient to insure an even flow through the extruding die. During the normal operation, little or no rubber passes through the overflow outlet 53, but if, for any reason, the feed of wire is stopped, the rubber will flow through the outlet 53 instead of through the extruding die, so that cooling and hardening of the raw rubber stock in the extruding chamber is prevented. The excess rubber discharged through the outlet 53 may be returned from time to time to the rubber mill. Whenever the wire feed is again started, the rubber will pass from the extruding die and the discharge of rubber through the overflow of the opening 53 will cease.

As shown in Fig. 1 of the drawings, the extruding mechanism is mounted on a supporting standard 54 carried by a base 55, which also supports an electric motor 56 for driving the extruding machine, a suitable belt 57 being provided for driving the extruding machine from the motor 56. The base 55 also supports a standard 58 which carries the wrapping mechanism D. Bearings 59 are mounted upon the top of the standard 58 and serve to rotatably support a tubular shaft 60 which is mounted closely adjacent to and in axial alinement with the extruding die 52, the shaft 60 having an internal diameter sufficient to permit the tape to pass freely therethrough. The shaft 60 is driven by means of a grooved pulley 61 fixed to its rear end over which passes a drive belt 62 which extends toward the forward end of the machine being guided over sheaves 63 and 64 mounted on the standard 58. At its forward end, the shaft 60 has fixed thereto a winding head 65 which is rectangular in form. The winding head has a rear side 66 through which the shaft 60 passes centrally and to which the shaft is fixed. The head has forwardly extending arms 67 and 68 which are parallel with the shaft 60 on opposite sides thereof. The front side 69 of the head serves as a gate and has tenons 70 and 71 which fit in mortises in the ends of the arms 67 and 68. A hinge pin 72 pivotally connects the tenon 70 to the arm 67 and a spring clip 73 serves to yieldably hold the tenon 71 in the mortise of the arm 68. The arms 67 and 68 project beyond the forward end of the tubular shaft 60 and the shaft 60 projects beyond the side 66 a sufficient distance to accommodate a wire holding reel 74 which may be loosely mounted on the shaft 60 to rotate with respect thereto. The gate 69 of the winding head is provided with a key-hole slot 75 which has an enlarged inner end alined with the tubular shaft 60 which is of a diameter to permit the tape to pass freely therethrough, the slot having a narrow portion extending to the free end of the gate member so that by turning the head to the proper angular position with respect to the tape, the tape will pass through the slot, permitting the gate 69 to swing to a position clear of the tape, so that a reel may be removed from the shaft 60. The arm 67 of the winding head is provided with guide sheaves 76 and 77 over which the wire from the reel 74 is passed. The gate 69 is provided with a lug 78 having a wire guiding aperture and positioned closely adjacent the tape passing through the slot 75. In the operation of the machine, the tape moves continuously through the tubular shaft 60 and through the slot 75 of the wrapping head. The end of the wire of a reel on the shaft 60 is passed over the sheaves 76 and 77 and guide lug 78 and is attached to the tape or to the end of a wire previously wound on the tape. As the wire tape passes through the wrapping head, the shaft 60 and head are continuously rotated winding the wire spirally around the tape, the wire being drawn from the reel 74 over the sheaves 76 and 77 onto the tape, as the head 65 revolves around the tape.

Figures 11, 12, 13, 14, 15, 16:
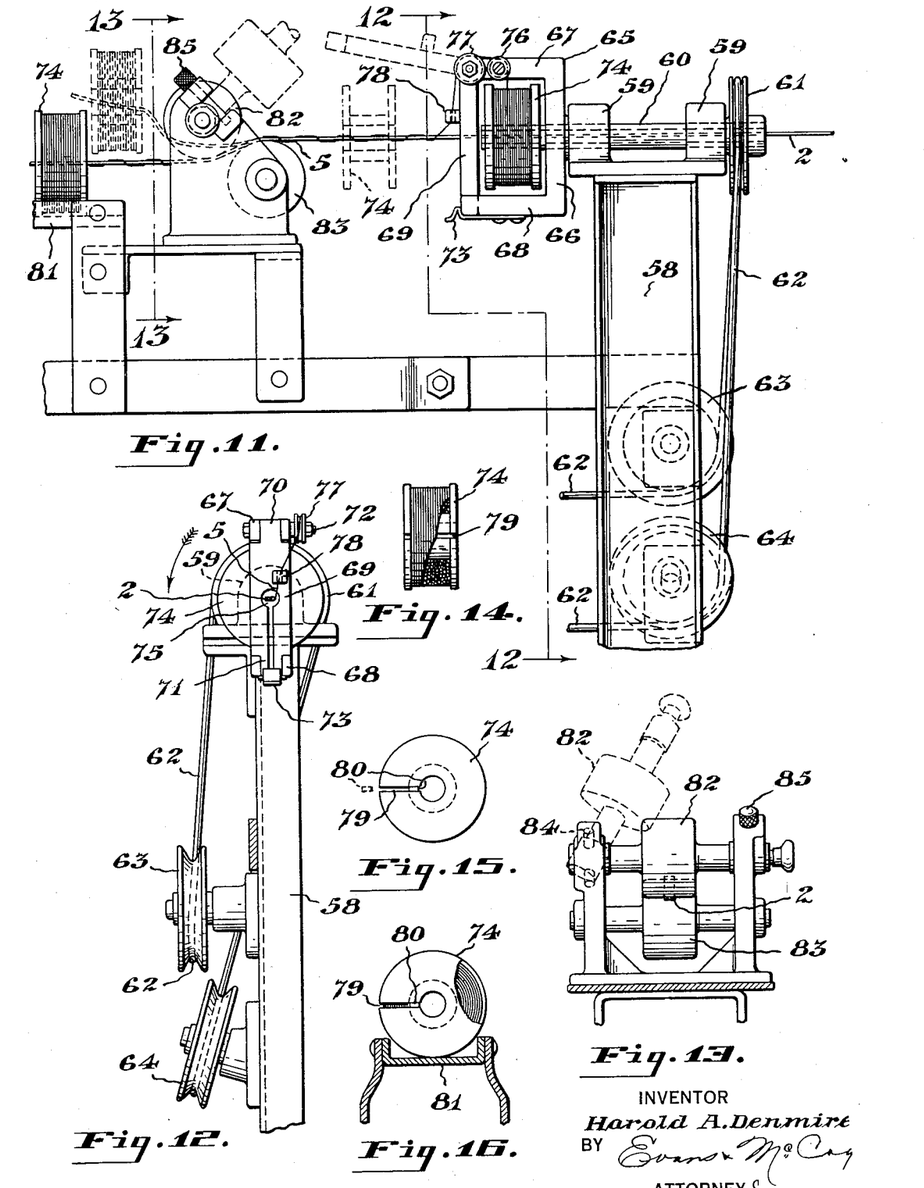
Fig. 11 is a side elevation of the tape wrapping mechanism on an enlarged scale.
Fig. 12 is a section taken on the line indicated at 12—12 in Fig. 11.
Fig. 13 is a section taken on the line indicated at 13—13 in Fig. 11.
Fig. 14 is a detail view showing one of the wrapping wire reels, a portion of the wire being broken away to show the radial slot in the reel which enables an empty reel to be removed laterally from the tape.
Fig. 15 is an end elevation of the reel shown in Fig. 14, showing the shim which prevents closing or narrowing of the slot by collapse of the reel when subjected to compression in winding wire thereon.
Fig. 16 is a vertical section through the support for reserve reels of wrapping wire.
Figures 17, 18, 19, 20:
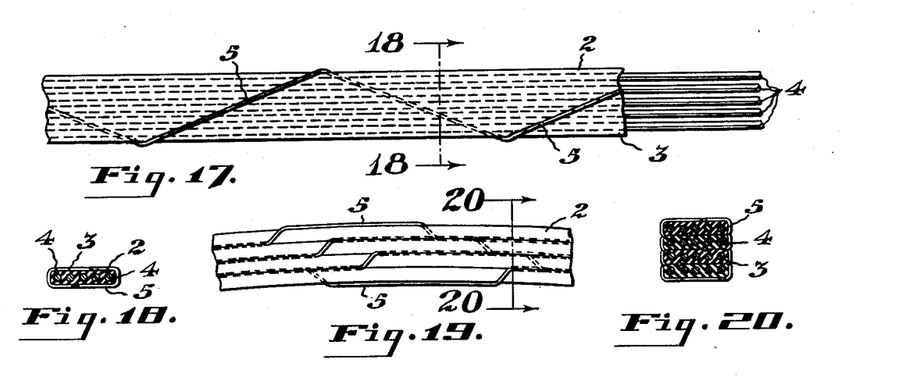
Fig. 17 is a fragmentary plan view showing a short length of the wire wrapped tape.
Fig. 18 is a section taken on the line indicated at 18—18 in Fig. 17.
Fig. 19 is a fragmentary side elevation showing on an enlarged scale a portion of a bead ring produced by the method and apparatus of the present invention.
Fig. 20 is a section taken on the line indicated at 20—20 in Fig. 19.
Figure 21:
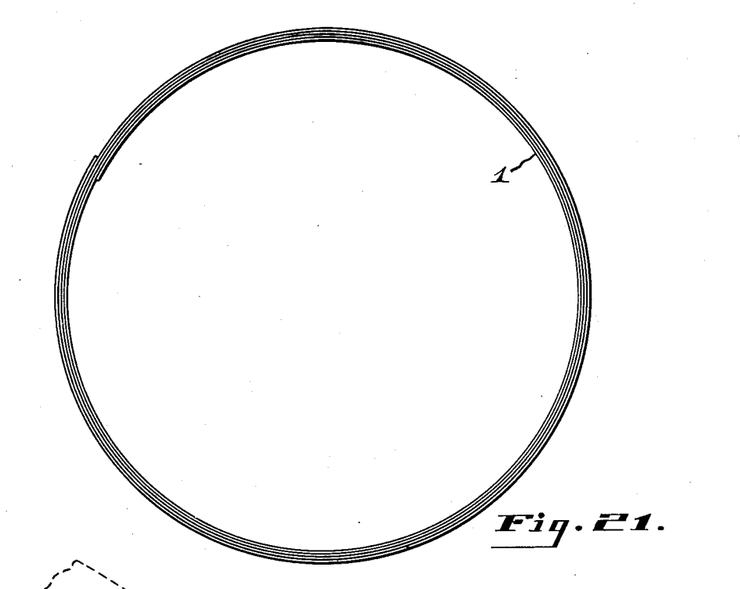
Fig. 21 is a side elevation of a bead ring produced by the method and apparatus of the present invention.

In order to permit the machine to operate continuously for a considerable period of time without the necessity of severing the tape to provide additional wrapping wire in the wrapping head, means is provided for supplying a considerable number of reels of wire to the wrapping head without severing the tape, empty reels being removed and full reels mounted in the head. The reels are so constructed that when the wire has been unwound therefrom, they can be removed from the tape. To this end, each reel 74 is provided with a radial slot 79 of a width sufficient to enable the tape to pass therethrough so that an empty reel can be detached from the shaft 60 moved along the tape to a position clear of the head removed laterally from the tape. In order to prevent the closing or narrowing of the slot 79 by pressure applied thereto in winding wire on the reel, each reel is provided with a shim 80 which fits snugly in the slot 79 and holds the reel against contraction during the winding of wire thereon. Forwardly of the winding head, there is mounted an elongated horizontal reel support 81 which is adapted to support a considerable number of full reels with their openings in alinement and in the path of travel of the tape, so that the tape can pass freely through the reels. At the rear end of the reel support, upper and lower guide rollers 82 and 83 are provided for guiding the tape into the reels. On the support 81, the lower roller 83 is journaled in the fixed bearings, while the upper roller 82 has a bearing at one end mounted on a pivot 84 to permit the roller to be swung laterally to a position clear of the tape, so that a full reel on the support 81 can be moved along the tape over the roller 83 and inserted on the shaft 60 in the winding head, the other bearing of the roller 82 being mounted in an open slot in the support and held in place by a retaining pin 85.

Whenever a reel on the shaft 60 becomes empty, the tape feed mechanism is momentarily stopped, the gate 69 is opened and the empty reel is removed from the shaft and slipped laterally off the tape. The roller 82 is then swung laterally clear of the tape and a reel from the support 81 is slipped along the tape over the roller 83 and onto the forward end of the shaft 60 within the winding head. The end of the wire on the reel is then passed over the sheaves 76 and 77 and threaded through the opening of the guide lug 78. The free end of the wire is then attached to the end of the wire previously wound on the tape, and the feed mechanism is again started in operation. The number of reserve reels of the wire on the support 81 determines the amount of tape that can be formed without severing the tape to provide a new supply of wrapping wire.

The cooling tank E is provided with guide rollers 86 and 87 mounted in the top thereof adjacent the front and rear and with a roller 87 adjacent the bottom of the tank. The tanks E contain cold water and the tape in passing over the rollers 86, 87 and 88 is thoroughly cooled. The tape, after passing through the cooling tank passes over two relatively wide pulling drums or rollers 89 and 90 which are simultaneously driven from an intermediate pulley 91, which is driven by a belt 92 from an electric motor 93. The tape is wound spirally around the rollers 89 and 90, as shown in Fig. 2, so that an effective frictional grip is obtained on the tape and the tape is positively fed at a uniform speed. The belt 62, which drives the tubular shaft 60 and winding head is driven from the pulley 91, so that the tape feeding mechanism and the wire wrapping mechanism have a common drive and are driven at predetermined relative speeds.

The tape passes from the pulling rollers 89 and 90 to the upper roller 94 of a festooning device, the roller 94 being supported at the upper end of standards 95. The festooning device consists of the upper roller 94, a floating roller 96, which is guided for vertical movement between the standards 95 and a fixed delivery roller 97 from which the tape is delivered to the drum or mandrel 98 of the bead ring machine G. The floating roller 96 is free to move vertically between the standards and is supported by the loop of the tape suspended from the upper roller 94. The weight of the roller 96 takes up the slack in the tape and the position of the roller 96 depends upon the amount of tape in the festoon which is dependent on the rate at which the tape is delivered from the festooning device to the bead ring machine.

In forming a bead ring, an end of the tape is attached to the drum or mandrel 98 and the drum is rotated through a predetermined number of revolutions to wrap the desired number of superimposed convolutions of tape thereon. The rotation of the drum is then stopped and the tape is severed and the completed ring is removed from the drum. During the interval in which the drum is stopped to permit the severing of the tape and the removal of the completed bead ring, the delivery of tape from the festooning device will be stopped and tape fed thereto by the pulling rollers will be taken up by a downward movement of the floating roller 96. The festooning device is so designed that the vertical movement permitted the floating roller 96 will be ample to take up the slack accumulating in the time normally required to remove a completed bead ring and restart the bead ring machine, so that the operation of the tape forming a wrapping mechanism need not be interrupted.

Occasionally, however, it may be necessary to discontinue the operation of the bead forming machine for a longer time than usual and in order to avoid the formation of an undesirable excess of tape, means is provided for automatically stopping the tape feeding mechanism upon the accumulation of a predetermined amount of slack in the festooning device. To this end, one bearing of the floating roller 96 is provided with a laterally projecting finger 99 which, in the upward and downward movements of the floating roller 96 engages with electric switches 100 and 101 which control the electric motor 93. The switch 101 is operated by the finger 99 on lowering of the roller 96 to break the motor circuit and stop the motor, so that whenever a sufficient amount of tape has been fed to the festooning device to lower the roller 96 to a point where the finger 99 engages the switch 101, the feed of the tape will be automatically stopped. When the finger 99 engages with the switch 100, the motor circuit is closed and the motor 93 is started into operation to drive the tape feeding mechanism. If the bead forming machine is stopped, the tape forming and feeding mechanism will continue to operate until the finger 99 is lowered into engagement with the switch 101, whereupon the motor 93 would be stopped and the feed of the tape will be discontinued until the motor is again started. When the bead ring machine is again started in operation, it will wind up the tape accumulated on the festooning device until the roller 96 has been lifted to the position in which the finger 99 engages the upper switch 100, whereupon the motor 93 will be started in operation and the feed of the tape will be resumed. Whenever the feed of the tape is stopped, the rubber in the extruding head will flow through the relief outlet 53 instead of through the extruding die and as soon as the feed of the tape is resumed, the flow will be diverted from the outlet 53 to the extruding die. Whenever a coil of wire on one of the reels 13 is exhausted, the empty reel can be swung laterally to a position clear of the other reels, as shown in dotted lines in Fig. 3 and a fresh coil of wire mounted thereon. The feed of the tape will be stopped momentarily until the wire on the replenished reel has been brazed to the end of the wire of the preceding reel.

It will be apparent that the present invention provides a very rapid and effective method of forming bead rings in which the wire reinforcement is firmly anchored in the body of rubber enveloping the same and in which the wire is uniformly spaced throughout the ring. Furthermore, it will be apparent that the rapidity of operation is greatly increased by providing a tape forming mechanism which may operate continuously and deliver to an intermittently operated bead ring machine.

Furthermore, the delays incident to the operation of the machine are greatly lessened by providing reel supports for the reinforcing wires which are readily accessible for replenishing the reels and by providing means for maintaining a relatively large supply of tape wrapping wire which is available for the wrapping operation without the necessity for frequently cutting the tape to supply wire to the wrapping mechanism. It will further be apparent that a very effective adhesion between the reinforcing wire and enveloping body of rubber will be obtained by reason of the fact that the wire is thoroughly cleansed, heated and dried immediately prior to its passage through the extruding head, so that a strong adhesion is obtained between each wire and the rubber in contact therewith.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. Bead ring forming apparatus comprising mechanism for continuously forming delivering a wire reinforced raw rubber tape, an intermittently operating bead ring machine to which the tape is delivered, a festooning device interposed between the tape forming mechanism and bead ring machine, and means operated by the festooning device for controlling the operation of the tape forming mechanism.

2. Bead ring forming apparatus comprising mechanism for continuously forming and delivering a wire reinforced raw rubber tape, an intermittently operating bead ring machine to which the tape is delivered, a festooning device interposed between the tape forming mechanism and bead ring machine, and means controlled by the festooning device for starting and stopping the tape forming and feeding mechanism.

3. Bead ring forming apparatus comprising mechanism for continuously forming and delivering a wire reinforced raw rubber tape, an intermittently operating bead ring machine to which the tape is delivered, a festooning device interposed between the tape forming mechanism and bead ring machine, said festooning device comprising an upper roller over which the tape passes and a floating roller supported by a loop of tape depending from the upper roller, and means controlled by vertical movements of the floating roller for starting and stopping the tape forming mechanism.

4. In a bead ring forming machine, the combination with means for continuously feeding a tape in endwise direction, of a wrapping mechanism comprising a tubular shaft through which the tape passes, means for supporting and driving said shaft, a reel coaxial with said tubular shaft and rotatably mounted thereon, and guiding means rotatable with said shaft for guiding a binding strand from the reel to the tape.

5. In a bead ring forming machine, the combination with means for continuously feeding a tape in endwise direction, of a wrapping mechanism comprising a tubular shaft through which the tape passes, means for supporting and driving said shaft, a reel coaxial with said tubular shaft and rotatably mounted thereon, a head fixed to said shaft and having means for releasably retaining said reel on the shaft, and means carried by said head for guiding a binding strand from the reel to the tape.

6. In a bead ring forming machine, the combination with means for continuously feeding a tape in endwise direction, of a wrapping mechanism comprising a tubular shaft through which the tape passes, means for supporting and driving said shaft, a reel rotatably mounted on the end of the shaft from which the tape emerges, a head fixed to the shaft inwardly of the reel and having parallel arms on opposite sides of the reel which project beyond the end of the shaft, a pivoted gate connecting the outer ends of the arms for releasably retaining the reel on the shaft, and guides carried by one of said arms and said gate for directing a binding strand from said reel to said tape.

7. In a bead ring forming machine, the combination with means for continuously feeding a tape in endwise direction, of a wrapping mechanism comprising a tubular shaft through which the tape passes, means for supporting and driving said shaft, a reel rotatably mounted on the end of the shaft from which the tape emerges, a head fixed to the shaft inwardly of the reel and having parallel arms on opposite sides of the reel which project beyond the end of the shaft, a pivoted gate connecting the outer ends of the arms for releasably retaining the reel on the shaft, and means for guiding a binding strand from the reel to said tape comprising a guide sheave on one of said arms and an apertured lug on said gate positioned adjacent the tape.

8. In a bead ring forming machine, a tubular shaft, means for supporting and driving said shaft, means for supporting a number of reels in axial alinement adjacent said shaft, each reel being adapted to be rotatably mounted on said shaft, means for feeding a tape endwise through said shaft and reels, each reel being slotted radially so that when empty, it may be removed laterally from the tape, and guiding means rotatable with said shaft for guiding a binding strand from a reel on said shaft to the tape.

9. In a bead ring forming machine, a tubular shaft, means for supporting and driving said shaft, means for feeding a tape endwise through said shaft, means for supporting a row of reels in axial alinement adjacent the end of the shaft from which the tape emerges, means for guiding the tape through said reels, each reel having a cylindrical axial opening of a size to rotatably fit on the tubular shaft and each reel having a radial slot which permits it to be removed laterally from the tape when empty, and means rotatable with the shaft for retaining a reel on the shaft and for guiding a binding strand from the reel on the shaft to the tape.

10. In a bead ring forming machine, a tubular shaft, means for supporting and driving said shaft, means for feeding a tape endwise through said shaft, means for supporting a row of reels in axial alignment adjacent the end of the shaft from which the tape emerges, means including a pair of guide rollers engaging opposite sides of the tape between the row of reels and the end of the tubular shaft, means for guiding the tape through said reels, one of said rollers being pivotally mounted to swing clear of the tape to permit a reel to be shifted from the supporting means to the tubular shaft, each reel having a cylindrical axial opening of a size to rotatably fit on the tubular shaft and each reel having a radial slot which permits it to be removed laterally from the tape when empty, and means rotatable with the shaft for retaining a reel on the shaft and for guiding a binding strand from the reel on the shaft to the tape.

HAROLD A. DENMIRE.